United States Patent [19]
LaForge et al.

[11] 3,755,868
[45] Sept. 4, 1973

[54] ADJUSTABLE CUTTING TOOL

[75] Inventors: Richard A. LaForge, Sterling Heights; Paul W. Falls, St. Clair Shores, both of Mich.

[73] Assignee: General Electric Company

[22] Filed: July 23, 1971

[21] Appl. No.: 165,540

[52] U.S. Cl............................................. 29/96 R
[51] Int. Cl............................................. B26d 1/12
[58] Field of Search...................... 29/96, 97, 105 R, 29/105 A; 82/36 R, 37 R

[56] References Cited
UNITED STATES PATENTS

| | | | |
|---|---|---|---|
| 3,252,202 | 5/1966 | Bullard | 29/96 |
| 3,283,626 | 11/1966 | Alvey et al. | 82/36 |
| 3,498,164 | 3/1970 | Miko et al. | 82/37 |
| 3,276,101 | 10/1966 | Plein | 29/105 |
| 3,189,976 | 6/1965 | Pickril | 29/96 |
| 3,363,299 | 1/1968 | Gowaulock | 29/105 |

*Primary Examiner*—Harrison L. Hinson
*Attorney*—Frank L. Neuhauser, Oscar B. Waddell, Joseph B. Forman and Allard A. Braddock

[57] ABSTRACT

An adjustable cutting tool of the type in which an adjustable cartridge is mounted on a toolholder. The toolholder has a recess at one end thereof for the reception of the cartridge. The recess has a base and three upstanding sides. The cartridge is releasably secured in the recess with two parallel sides of the cartridge adaptable for slidable engagement with the parallel sides of the recess. Two wedges are mounted in the recess, each one of which contacts a surface of the cartridge. Adjustment screws engage each of said wedges, and by adjustment of the wedges the cartridge is moved either longitudinally or laterally. Preload means operate in cooperation with the adjustment means to maintain the cartridge under near constant load during adjustment.

6 Claims, 4 Drawing Figures

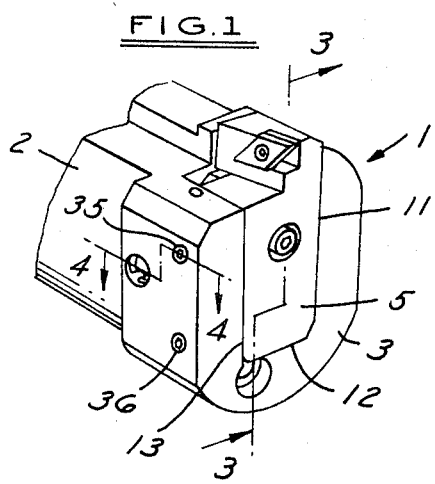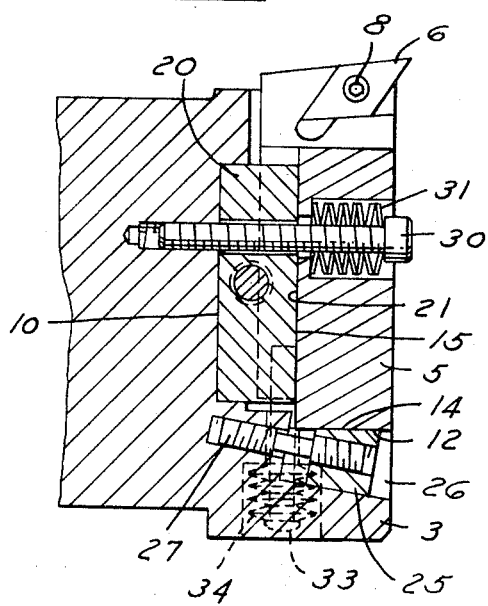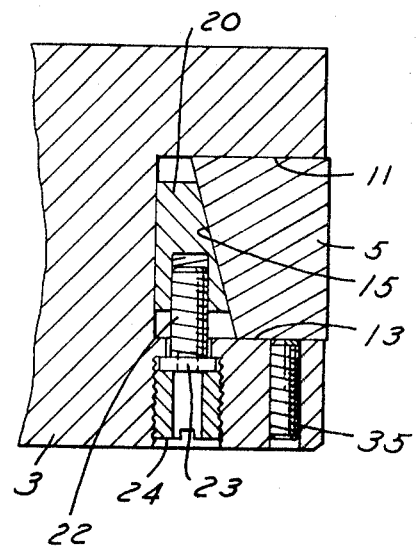

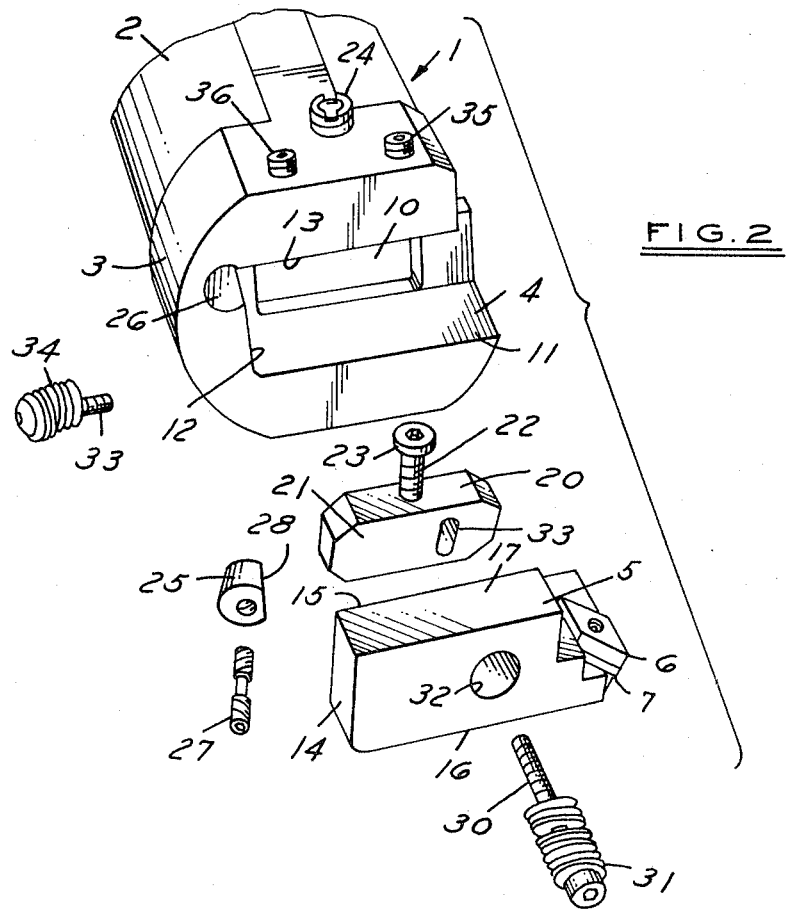

ADJUSTABLE CUTTING TOOL

This invention relates to an adjustable cutting tool, and specifically to a cutting tool of the type in which a cartridge is mounted on a toolholder and may be adjusted either longitudinally or laterally.

It is frequently necessary in machining operations to provide for the precise positioning of a single-point cutting tool with respect to the part being machined. Many cutting tools are available which provide for both longitudinal and lateral adjustment of the cutting tool for precision adjustment. However, it is desirable to provide such longitudinal and lateral adjustment independently, so that precise adjustment may be made in one plane without disturbance of the adjustment in the other plane. Moreover, it is also desirable to perform such independent adjustment in reverse directions in the longitudinal or lateral plane.

The present invention provides a cutting tool which is independently and precisely adjustable in either the longitudinal or lateral direction, the adjustment being equally precise either outwardly or inwardly along either the longitudinal or lateral direction. This is accomplished by a toolholder containing a recess at one end for the reception of a cartridge and two wedge-shaped members within the recess which bear against surfaces of the cartridge. The wedges are movable, and the surfaces of the cartridge and their relationship with the surfaces of the pocket are such that upon movement of either wedge the cartridge is adjusted in either the longitudinal or lateral direction independently. A preload means operates substantially along the direction of adjustment of the cartridge to maintain the cartridge under near-constant load during adjustment, thereby insuring precise adjustment either inwardly or outwardly by simple movement of the wedge-shaped members.

The invention will be better understood by consideration of the following description taken in connection with the accompanying drawing in which FIG. 1 is a perspective view of an adjustable cutting tool in accordance with the invention;

FIG. 2 is an exploded view of the assembled tool shown in FIG. 1;

FIG. 3 is a cross-sectional view taken along the lines 3—3 of FIG. 1; and

FIG. 4 is a cross-sectional view taken along the lines 4—4 of FIG. 1.

The cutting tool shown in the drawing is an adjustable cartridge boring bar of the type frequently used to machine the inner diameter of steel parts. The boring bar comprises a toolholder 1 containing a bar shank 2 adapted to be mounted either directly or through an adapter to a conventional machine tool. The toolholder 1 contains a head portion 3 containing a recess 4 in which is mounted a cartridge 5. The cartridge may be of known design having an indexable and invertible disposable cemented carbide insert 6 and a cemented carbide seat 7 mounted at an extremity thereof, as for example by pin-type means 8 extending within a hole in the center of the insert and the seat.

The recess 4 in the toolholder contains a base surface 10 and three upstanding sides 11, 12 and 13, two of which, 11 and 13, are parallel to each other, the third 12 connecting the parallel sides. All three sides of the recess are perpendicular to the base 10. The cartridge 5 has two wedge contacting surfaces, 14 and 15, and two parallel bearing surfaces, 16 and 17. The bearing surfaces are adapted for slidable engagement with the parallel sides 11 and 13 of the recess. Mounted in the base 10 of the recess is wedge member 20 containing a tapered upper surface 21. The upper tapered surface of the wedge member 20 mates with a complementary lower tapered surface 15 on the cartridge 5. Wedge member 20 is movable across base surface 10 of the toolholder by means of adjustment screw 22 containing head 23. Adjustment screw 22 is in turn retained in place in the tool-holder by means of a hollow threaded insert 24 which captures the head 23 of the adjustment screw 22. Adjustment screw 22 has a hexagonal opening in its head portion, accessible with a hexagonal wrench through hollow insert 24. Insert 24 maintains the screw 22 in position with respect to the toolholder, so that only wedge member 20 moves as adjustment screw 22 is rotated.

A second wedge member 25 is contained in slot 26 adjacent upstanding side 12 of the recess of the toolholder. Wedge member 25 is in turn retained in the tool-holder by means of a differential adjustment screw 27 within a threaded hole in wedge 25 and an opposite hand-threaded hole in the head portion 3. Upon rotation, differential screw 27 moves wedge member 25 outwardly or inwardly along the axis of slot 26, which is at a slight angle (10°–15°) to the axis of the cutting tool. Wedge member 25 is generally cylindrical except for a flat surface 28 which bears against perpendicular wedge contacting surface 14 of the cartridge. Wedge member 25 and its differential adjustment screw 27 are mounted in the slot 26 such that flat surface 28 of the wedge member always remains perpendicular to the base surface 10 of the recess.

It will thus be seen that movement of adjustment screw 22 will move wedge member 20 against the tapered lower surface 15 of the cartridge and thereby adjust the cartridge along the axis of the cutting tool. Such axial adjustment by rotation of adjustment screw 22 will have no effect upon the radial adjustment of the cartridge. Conversely, rotation of adjustment screw 27 will move wedge member 25 and effect adjustment of the cartridge along the radius of the cutting tool without changing the axial adjustment of the cartridge.

In order to insure precise inward and outward adjustment of the cartridge along both the axial and radial directions, there are provided two preload means, each acting independently substantially along the direction of adjustment of the cartridge to maintain the cartridge under near-constant load during adjustment. The first preload means comprises retention screw 30 and a series of spring washers 31 mounted on the retention screw. Retention screw 30, with the washers 31 mounted thereon, fits within a hole 32 through the cartridge and an elongated slot 33 through the wedge member 20 into a threaded hole in the base surface 10 of the recess of the toolholder. A second preload means comprising a similar retention screw 33, upon which are mounted spring washers 34, is threaded directly into a threaded hole in cartridge 5 through a hole in the toolholder.

The head of the toolholder also contains a pair of lock screws 35 and 36 threaded into the head thereof. The lock screws bear against surface 17 of the cartridge and serve to lock the cartridge in position after adjustment. Adjustment of the cartridge is effected in the following manner. Lock screws 35 and 36 are both loosened. If adjustment in an axial direction is desired, adjustment screw 22 is rotated either clockwise or counterclockwise, depending upon whether the adjustment is intended to be inward or outward. Because the adjustment means is operating under near-constant load during adjustment, adjustment can be accomplished precisely either inwardly or outwardly. Rotation of adjustment screw 22 changes only the axial adjustment of the cartridge. The cartridge retains precisely the same radial position before and after axial adjustment. Conversely, adjustment in a radial direction is effected by rotation of adjustment screw 27. After adjustment in either the radial or axial direction is completed, lock screws 35 and 36 are retightened to lock the cartridge in adjusted position.

The preload mechanism described maintains a near-constant tension between the cartridge and the adjusting devices, which enables both outward and inward adjustment capability in both a radial and axial direction. Further, the preload conditions for either the range of adjustment or the pounds of load (tension) applied may be varied by the addition or subtraction of spring washers of the type shown at 31 and 34. The preload is determined under normal circumstances by the number of washers used and their displacement. This is accomplished by tightening retention screws 30 and 33 until they can be tightened no further. The screws are then backed off an amount sufficient to achieve the preload desired for a predetermined adjustment range.

We claim:

1. An adjustable cutting tool capable of independent longitudinal and lateral adjustment comprising a toolholder, one end of which contains a recess for the reception of an adjustable cartridge, said recess having a base and three upstanding sides, two of which are aparallel, a cartridge releasably secured in said recess, said cartridge having a first wedge-contacting surface for transmitting longitudinal movement to said cartridge and a second wedge-contacting surface for transmitting lateral movement to said cartridge, said cartridge having two parallel bearing surfaces adapted for slidable engagement with the parallel sides of the recess, a wedge block positioned in the recess in contact with said first wedge-contacting surface, said block being laterally movable with respect to said toolholder, a generally cylindrical wedge member having an axially inclined flat surface positioned in the recess with said flat surface in contact with said second wedge-contacting surface, said cylindrical wedge member being longitudinally movable with respect to said toolholder, adjusting means engaging said wedge block for imparting lateral movement to said wedge block, adjusting means engaging said generally cylindrical wedge for imparting longitudinal movement to said generally cylindrical wedge, preload means operating substantially along the direction of adjustment of said cartridge to maintain said cartridge under load during adjustment thereof, and locking means for locking said cartridge in position after adjustment.

2. The cutting tool of claim 1 in which one of said wedge contacting surfaces on the cartridge is tapered and mates with a complementary tapered surface on one of said wedges and the other of said wedge contacting surfaces on the cartridge is perpendicular to the base thereof and mates with a complementary shaped surface on the other of said wedges.

3. The cutting tool of claim 1 in which the two upstanding parallel sides of the recess in the tool-holder are substantially perpendicular to the base.

4. The cutting tool of claim 1 in which the preload means comprises two separate preload means, each acting independently in either a lateral or a longitudinal direction on the cartridge.

5. The cutting tool of claim 1 in which the preload means maintains said cartridge under near-constant load during adjustment thereof.

6. The preload means of claim 5 in which the preload is variable and comprises a series of spring washers attached to the toolholder by a spring retention means.

* * * * *